United States Patent Office 2,768,153
Patented Oct. 23, 1956

2,768,153

PROCESS FOR CURING POLYEPOXIDES AND RESULTING PRODUCTS

Edward C. Shokal, Walnut Creek, Calif., assignor to Shell Development Company, New York, N. Y., a corporation of Delaware No Drawing. Application February 24, 1955,
Serial No. 490,420

19 Claims. (Cl. 260—47)

This invention relates to a process for curing polyepoxides. More particularly, the invention relates to a new process for curing polyepoxides with acid anhydrides using a special class of activators for the acid anhydrides, and to the resulting cured products.

Specifically, the invention provides a new process for curing and resinifying polyepoxides, and preferably the glycidyl polyethers and polyesters, which comprises mixing and reacting the polyepoxide with a carboxylic acid anhydride and an activator for the anhydride comprising a member of the group consisting of organo-substituted phosphines, arsines, stibines and bismuthines. The invention further provides cured products obtained by the above-described process which are characterized by their excellent hardness and durability and lack of color.

It is known that acid anhydrides may be used by themselves as curing agents for polyepoxides, such as the glycidyl polyethers of polyhydric phenols. When used by themselves, however, the anhydrides have certain undesirable properties which have placed a considerable limitation on their commercial utilization as curing agents for the polyepoxides. It has been found, for example, that the acid anhydrides show little activity in the cure of the polyepoxides at room temperature or at slightly elevated temperatures and are effective only at very high temperatures. This prevents their use in the preparation of compositions that are to be cured at room temperature or compositions that might be injured by the high temperatures. Even at the high reaction temperatures, the anhydrides in many cases act very slowly and they are unable to be used in compositions which must be cured rapidly. Furthermore, the products obtained by the use of the anhydrides are sometimes deficient, particularly as to color, hardness and durability.

It is an object of the invention to provide a new method for curing polyepoxides. It is a further object to provide a new process for curing polyepoxides using acid anhydrides and a special class of activators for the anhydrides. It is a further object to provide a new process for curing polyepoxides that may be used at or near room temperature. It is a further object to provide a new process for curing polyepoxides that gives the desired cure at room temperature without the liberation of an excessive amount of heat. It is a further object to provide a process for curing polyepoxides that gives a rapid rate of cure at elevated temperatures. It is a further object to provide a method for curing polyepoxides that gives cured products having excellent hardness and durability and are free of discoloration. These and other objects of the invention will be apparent from the following detailed description thereof.

It has now been discovered that these and other objects are accomplished by the process of the invention comprising mixing and reacting the polyepoxide with a carboxylic acid anhydride and an activator for the anhydride comprising a member of the group consisting of organo-substituted phosphines, arsines, stibines and bismuthines. It has been found that when the anhydrides are used in combination with the above-noted activators they display surprisingly high activity as curing agents for the polyepoxides, and particularly for those having terminal epoxy groups such as the glycidyl polyethers and polyesters, over a wide range of temperatures. This combination, for example, gives excellent cure of the polyepoxides at or near room temperature and does so without the liberation of large amounts of heat. The combination is thus ideally suited for use in the preparation of room temperature cure surface coatings and moldings and castings where a low exotherm is desired. At the higher temperatures, the combination of anhydride and activator gives a very rapid rate of cure and is particularly suited for use in the preparation of rapid cure high temperature enamels and paints such as may be used on assembly lines. Additional advantage is also found in the fact that the products obtained by the use of the activators are greatly improved in hardness and durability and lack discoloration present in many of the other anhydride cured products.

The acid anhydrides used as the curing agent in the process of the invention may be any anhydride derived from a polycarboxylic acid which possesses at least one anhydride group, i. e., a

The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3,6-endomethylene 1,2,3,6-tetrahydrophthalic anhydride (chlorendic anhydride), succinic anhydride, maleic anhydride, chlorosuccinic anhydride, monochloromaleic anhydride, 6-ethyl-, 4-cyclohexadiene,1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, 3-methoxy-1,2,3,6-tetrahydrophthalic acid anhydride, 3-butoxy-1,2,3,6-tetrahydrophthalic anhydride, pyromellitic anhydride, di-, tetra- and hexahydropyromellitic anhydride, polyadipic acid anhydride, polysebacic acid anhydride, and the like and mixtures thereof.

Preferred anhydrides to be employed in the process comprises the aromatic mono- and dianhydrides (i. e., those possessing two of the above-noted anhydride groups such as pyromellitic anhydride), aliphatic and cycloaliphatic monoanhydrides, and the chlorinated derivatives of the aforedescribed mono- and dianhydrides. Especially preferred are the normally liquid or low melting anhydrides, such as hexahydrophthalic anhydride.

The activator for the anhydrides comprises members of the group consisting of organo-substituted phosphines, arsines, stibines and bismuthines. The organo-substituted phosphines may be exemplified by the formula P(R)₃ wherein at least one R is an organic radical and the other R's are hydrogen or organic radicals. Preferred phosphines include the trihydrocarbyl phosphines, the dihydrocarbyl phosphines and monohydrocarbyl phosphines, such as tricyclohexyl phosphine, trioctyl phosphine, diphenyl cyclohexyl phosphine, tributyl phosphine, trihexenyl phosphine, trixylyl phosphine, triethyl phosphine, dicyclohexyl phosphine, tridodecyl phosphine, tricyclohexenyl phosphine, cyclohexyl phosphine and trihexyl phosphine. Particularly preferred phosphines include the trialkyl, the tricycloalkyl, the tri(alkylcycloalkyl), the triaryl and tri-(alkaryl) phosphines and particularly those wherein each alkyl, cycloalkyl, alkylcycloalkyl, aryl and alkaryl radicals contain no more than 12 carbon atoms, and especially not more than 8 carbon atoms. Coming under special consideration, particularly because of their high degree of activity as an activator are the aromatic hydrocarbyl phosphines.

The organo-substituted arsines useful as activators are those of the formula $AS(R)_3$ wherein at least one R is an organic radical and the other R's may be hydrogen or organic radicals. Particularly preferred arsines include the trihydrocarbyl arsines and the dihydrocarbyl aines such as tricylohexyl arsine, triphenyl arsine, trioctyl arsine, diphenyl butyl arsine, trixylyl arsine, tridecyl arsine, dicyclohexyl arsine, and tricyclohexenyl arsine. Particularly preferred arsines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and preferably not more than 9 carbon atoms.

The organo-substituted stibines are those of the formula $Sb(R)_3$ wherein at least one R is an organic radical and the other R's may be hydrogen or organic radicals. Preferred stibines include the trihydrocarbyl stibines and the dihydrocarbyl stibines, such as triphenyl stibine, tridodecyl stibine, tributyl stibine, dicyclohexyl stibine, tricyclohexenyl stibine and tri(2-ethylhexyl) stibine. Particularly preferred stibines include the trialkyl, tricycloalkyl, tri(alkylcycloalkyl), triaryl and trialkaryl stibines and particularly those wherein each alkyl, cycloalkyl, alkcycloalkyl and aryl and alkaryl radicals contain no more than 12 carbon atoms and preferaby not more than 9 carbon atoms.

The organo-substituted bismuthines are those of the formula $Bi(R)_3$ wherein at least one R is an organic radical and the other R's may be hydrogen or organic radicals. Preferred bismuthines include the the trihydrocarbyl bismuthines and the dihydrocarbyl bismuthines, such as, for example, trixylyl bismuthine, triphenyl bismuthine, tributyl bismuthine, tricyclohexyl bismuthine, tridecyl bismuthine and diphenyl octyl bismuthine. Particularly preferred bismuthines include the trialkyl, tricycloalkyl, tri(alkcycloalkyl) triaryl and trialkaryl bismuthines and particularly those wherein each alkyl, cycloalkyl, alkcycloalkyl and aryl and alkaryl radiacls contain no more than 12 carbon atoms and preferably not more than 8 carbon atoms.

According to the process of the invention, the polyepoxide is cured by admixing and reacting the above-described anhydrides and activators with the polyepoxide. The amount of the anhydride to be used in the process will vary over a wide range. Good cures are obtained by reacting the polyepoxide with at least .8 equivalents of the anhydride. As used herein in relation to the amount of anhydride and polyepoxide, the expression "equivalent" amount refers to that amount of anhydride needed to furnish one anhydride group for every epoxy group in the polyepoxide to be involved in the cure. To obtain the best results, the anhydride should be employed in about at least a chemical equivalent amount, and more preferably in equivalent ratio of 1:1 to 1.5:1.

The activators, i. e., the organo-substituted phosphines, arsines, stibines and bismuthines, are needed only in very small amounts. Excellent results are obtained when the activator is utilized in amounts varying from 0.1% to 4% by weight of the resin, i. e., resin containing both polyepoxide and anhydride, and more preferably in amounts varying from 0.1% to 2% by weight of the resin.

The anhydride and activator may be combined together before they are added to the polyepoxide or they may be added separately.

In executing the process of the invention, it is desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride-phosphine mixture by evaporation before or during the curing, such as ketones like acetone, methyl ethyl ketone, methyl isobutyl ketone, isophorone, etc., esters such as ethyl acetate, butyl acetate, Cellosolve acetate (ethylene glycol monoacetate) methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc., and/or alcohols, such as ethyl, isopropyl or n-butyl alcohol. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semisolid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. As indicated, the above-described anhydride-activator combination are active near room temperature, e. g., about 15° C. to 20° C., and the cure may be accomplished by merely mixing the anhydride-activator combination with the polyepoxide as indicated above and then letting the mixture stand at room temperature. In some applications, it may be desirable to effect a more rapid cure and this may be accomplished by raising the temperature. Excellent rates of cure are obtained at temperatures from 50° C. to 110° C. and these are preferred from many applications where heating is permissible. Temperatures much above 200° C. are generally not desirable but may be employed if necessary.

The curing agent-polyepoxide systems described above may be utilized for a great variety of important applications. Because of their low temperature cure properties, they are particularly useful in the preparation of room temperature cure coating compositions, and because of their rapid high temperature cures are useful in the formation of baking enamels and paints. In these applications, it is generally desirable to combine the polyepoxide with the anhydride and activator and desired solvents or other film-forming materials, and then apply this mixture to the surface to be coated. The coatings may then be allowed to set at room temperature or heat may be applied.

The systems described above are also very useful in the preparation of pottings and castings. They are particularly suitable for preparing very large castings as can be cured at low temperatures without liberation of large amounts of heat and this gives a more even cure which results in much stronger and more durable products. In this application, the mixture of polyepoxide, anhydride, and activator alone or with suitable diluents is added to the desired mold or casting and then allowed to set at room temperature. Heat may be applied in some cases to hasten cure.

The above-described systems are also useful in the preparation of laminates. In this application, the sheets of fibrous material are first impregnated with the mixture of polyepoxide, anhydride and activator. This is conveniently accomplished by dissolving the anhydride and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their excellent hardness, durability and good water resistance as well as by lack of discoloration which accompanies many of the other anhydride cured systems.

The polyepoxides to be cured by use of the above process may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)-octane, 1,4-bis(2,3-epoxypropoxy)cyclohexane, 4,4' - bis(2 - hydroxy - 3,4 '- epoxybutoxy)diphenyldimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl)-propane (Bisphenol A), 2,2-bis(4-hydroxy-phenol)-butane, 4,4'-dihydroxybenzophenone, bis(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

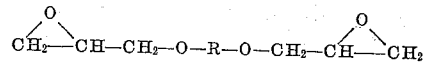

wherein R represents a divalent hydrocarbon radical of the dihydric phenol. The polymeric products will generally not be a single simple molecule but will be a complex mixture of glycidyl polyethers of the general formula

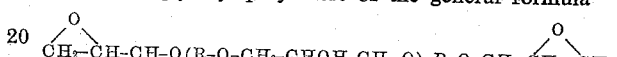

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

*Polyether A*

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

*Polyether B*

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

*Polyether C*

About 228 parts of 2,2-bis(4-hydroxyphenyl)propane and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' Mercury Method melting point of the resulting product is 52° C. and the molecular weight is about 710. The product has an epoxy value of 0.27 eq./100 g.

*Polyether D*

By using a smaller ratio of epichlorohydrin to 2,2-bis(4-hydroxyphenyl)propane a glycidyl polyether of higher melting point was obtained. Thus, Polyether D was obtained in the same manner as Polyether C except that for every mole of 2,2-bis(4-hydroxyphenyl)propane, there was used 1.57 moles of epichlorohydrin and 1.88 moles of sodium hydroxide. This provided a product having a melting point of about 70° C., a molecular weight of 900 and an epoxide value of 0.20 eq./100 g.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' Mercury Method softening point no greater than 60° C.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides that may be used in preparing the emulsions comprise the glycidyl ethers of novalac resins which resins are obtained by condensing an aldehyde with a polyhydric phenol. A typical member of this class is the epoxy resin from formaldehyde 2,2-bis(5-hydroxyphenol)propane novalac resin which contains as predominant constituent the substance represented by the formula

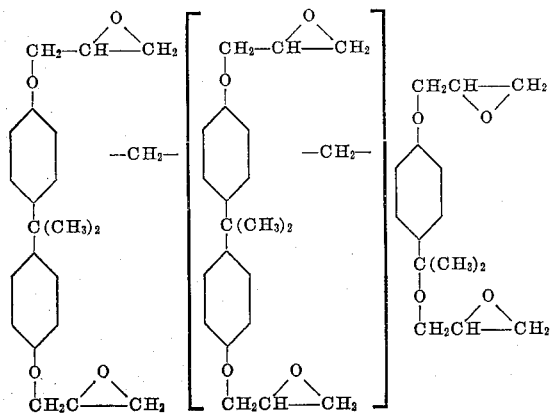

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

A further group of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxyaldehydes, hydroxy-ketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl) dimethylmethane, 1,4-dimethylolbenzene, 4,4'-dimethyloldiphenyl, dimethyloltoluenes, and the like. The polyhydric ether alcohols include, among others, diglycerol, triglycerol, dipentaerythritol, tripentaerythritol, dimethylolanisoles, beta-hydroxyethyl ethers of polyhydric alcohols, such as diethylene glycol, polyethylene glycols, bis(beta-hydroxyethyl ether) of hydroquinone, bis(beta-hydroxyethyl ether) of bisphenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxydiethyl sulfide, 2,2'-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alpha-monothioglycerol, alpha,alpha-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols amy be exemplified by the monochloride of pentaerythritol, monochloride of sorbitol, monochloride of mannitol, monochloride of glycerol, and the like.

The preparation of some of these polyepoxy polyethers may be illustrated by the following:

PREPARATION OF GLYCIDYL POLYETHERS
OF POLYHYDRIC ALCOHOLS

*Polyether E*

About 276 parts (3 moles) of glycerol was mixed with 832 parts (9 moles) of epichlorohydrin. To this reaction mixture was aded 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It had an epoxide value of 9.671 equivalent per 100 grams and the molecular weight was 324 as measured ebullioscopically in dioxane solution. The epoxy equivalency of this product was 2.13. For convenience, this product will be referred to hereinafter as Polyether E.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Other polyepoxide compounds include the polymers and copolymers of the epoxy-containing monomers possessing at least one polymerizable ethylenic linkage, such as, for example, allyl glycidyl ether. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxy-propyl crotonate), allyl 2,3-epoxypropyl ether-styrene copolymer, methallyl 3,4-epoxybutyl ether-allyl benzoate copolymer, poly (vinyl 2,3-epoxypropyl ether), allyl glycidyl ether-vinyl acetate copolymer and poly(4-glycidyloxystyrene).

These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

Polyether F

About 100 parts of allyl glycidyl ether was heated at 155° C. in a glass flask and ditertbutyl peroxide added incrementally for 15 hours until 3% had been added. Excess monomer was removed, leaving 36 g. of polymer. The poly(allyl glycidyl ether) obtained as the resulting product had a molecular weight of about 481–542 and an epoxy value of 0.50 eq./100 g. and a viscosity of 15 poise. For convenience, this product will be referred to hereinafter as Polyether F.

Particularly preferred members of the above-described group comprise the polymers and copolymers of the 2-alkenyl glycidyl ethers having a molecular weight between 300 and 1000 and an epoxy equivalency greater than 1.0 and preferably between 1.2 and 6.0.

Of special interest are the polyepoxides containing only carbon, hydrogen, oxygen and chlorine.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

EXAMPLE I

This example illustrates the unexpected superiority in cure that is obtained by using the anhydrides in combination with organo-susbtituted phosphines as compared to the results obtained with the anhydrides by themselves.

(a) About 100 parts of polyallyl glycidyl ether (Polyether F described above) was combined with a mixture of 100 parts of hexahydrophthalic anhydride and 3 parts of triphenyl phosphine. This mixture was poured in a metal cup and allowed to stand at room temperature. The mixture set up in 18 hours to form a hard casting which was clear, hard and had good durability and water resistance.

(b) The above experiment was repeated with the exception that no triphenyl phosphine was added to the mixture. In this case, the mixture remained as thick liquid even after 7 days at room temperature.

EXAMPLE II

Example I (a) was repeated with the exception that the mixture containing the polyallyl glycidyl ether, hexahydrophthalic anhydride and triphenyl phosphine was heated to 50° C. In this case, the mixture set up to a casting having a Barcol hardness of 24 in 6 hours.

EXAMPLE III

This example illustrates the use of a hexahydrophthalic anhydride-triphenyl phosphine combination curing Polyether E.

About 100 parts of Polyether E was combined with 200 parts of hexahydrophthalic anhydride and 4 parts of triphenyl phosphine. This mixture set up in about 19 hours to form a hard casting which was clear, hard and had good durability and water resistance.

EXAMPLE IV

This example illustrates the use of a hexahydrophthalic anhydride-triphenyl phosphine combination in curing Polyether A.

About 19.1 parts of Polyether A was combined with 15.4 parts of hexahydrophthalic anhydride and 0.6 part of triphenyl phosphine. This mixture was poured into metal cups and allowed to stand at room temperature. The mixture set up in about 29 hours to form a hard casting. After 3 days it had a Barcol hardness of 20 and after 7 days 36. It was transparent with a light yellow color and unaffected by boiling in $H_2O$ 10 minutes.

EXAMPLE V

Example IV was repeated with the exception that the mixture containing Polyether A, hexahydrophthalic anhydride and triphenyl phosphine was heated to 50° C. In this case, the mixture set upon in 20 hours to form a clear casting with a Barcol hardness of 33.

EXAMPLE VI

Example IV was repeated with the exception that the mixture containing Polyether A hexahydrophthalic anhydride and triphenyl phosphine was heated to 100° C. In this case, the mixture set up in about 25 minutes to form a clear, hard casting and developed a Barcol hardness of 39 after 5 hours.

EXAMPLE VII

This example illustrates the use of a chlorendic anhydride-triphenyl phosphine combination in curing polyallyl glycidyl ether.

About 100 parts of polyallyl glycidyl ether (Polyether F) was combined wtih 200 parts of chlorendic anhydride and 5 parts of triphenyl phosphine. On mixing the reaction was so rapid efficient cooling at room temperature was necessary. It quickly set to a hard brittle casting.

EXAMPLE VIII

This example illustrates the use of phthalic anhydride-triphenyl phosphine combination in curing Polyether A at 100° C.

About 100 parts of Polyether A was combined with 90 parts of phthalic anhydride and 5 parts of triphenyl phosphine. This mixture was placed in a mold and heated to 100° C. In 40 minutes the mixture had set up to a hard clear casting.

EXAMPLE IX

This example illustrates the use of hexahydrophthalic anhydride - tri(3,5,5-trimethylcyclohexyl)phosphine combination as curing agent for polyepoxides.

About 100 parts of Polyether A is combined with 100 parts of hexahydrophthalic anhydride and 3 parts of tri-(3,5,-trimethylcyclohexyl) phosphine. This mixture is placed in a mold and heated to 100° C. The mixture sets up in a few minutes to form a hard, clear casting.

Similar results are obtained by replacing Polyether A in the above process with equivalent amounts of each of the following: Polyether F, Polyether B and Polyether C.

EXAMPLE X

This example illustrates the use of phthalic anhydride-tri(2-ethylhexyl) phosphine combination in curing polyepoxides.

About 100 parts of Polyether A is combined with 80 parts of phthalic anhydride and 3 parts of tri(2-ethylhexyl) phosphine. This mixture is placed in a mold and heated to 100° C. The mixture set up in a few minutes to form hard, clear castings.

Similar results are obtained by replacing Polyether A in the above process with equivalent amounts of each of the following: Polyether B, Polyether F and Polyether D.

EXAMPLE XI

This example illustrates the use of phthalic anhydride-diphenyl phosphine combination in curing polyepoxides.

About 100 parts of polyallyl glycidyl ether is combined with 98 parts of phthalic anhydride and 5 parts of diphenyl phosphine. This mixture was placed in a mold and heated to 100° C. The mixture set up in a few minutes to form a hard, clear casting free of phosphine odor.

Similar results are obtained by replacing the diphenyl phosphine in the above process with equal amounts of the following: tridecyl phosphine, tricyclohexenyl phosphine, tridodecenyl phosphine, and trixylyl phosphine.

EXAMPLE XII 191 parts of Polyether A and 154 parts of hexahydrophthalic anhydride were mixed together to form a blend. A portion of the blend was mixed with 2% by weight of triphenyl-arsine and heated in a tin cup for 5 hours at 100° C. The resulting casting had a very clear light yellow color and a Barcol hardness of 36. It remained clear after boiling in water 10 minutes.

Similar results are obtained by replacing Polyether A in the above process with equivalent amounts of each of the following: Polyether B, Polyether F and Polyether D.

EXAMPLE XIII 50 part portions of each of the blends prepared in the preceding example was mixed with 2% by weight of tri-(2-ethylhexyl) arsine. The mixtures were placed in molds and heated to 50° C. In a short period, the mixtures set up to clear hard castings.

Similar results are obtained by replacing the tri(2-ethylhexyl) arsine with equal amounts by weight of each of the following: tricyclohexyl arsine, tridodecyl arsine and diphenyl octyl arsine.

EXAMPLE XIV 191 parts of Polyether A and 154 parts of hexahydrophthalic anhydride were mixed together to form a blend. A portion of the blend was mixed with 2% by weight of triphenyl stibine and heated in a tin cup for 5 hours at 100° C. The resulting polymer had a Barcol hardness of 29 and a light red orange transparent color.

EXAMPLE XV

A 50 part portion of the blend prepared in the preceding example was mixed with 2% by weight of tri(2-ethylhexyl) stibine. This mixture was placed in a tin cup and heated at 100° C. In a short period, the mixture set up to a hard clear casting.

Similar results are obtained by replacing the tri(2-ethylhexyl) stibine with equal amounts of each of the following: trixylyl stibine, diphenyl octyl stibine.

EXAMPLE XVI 191 parts of polyether A and 154 parts of hexahydrophthalic anhydride were mixed together to form a blend. A portion of the blend was mixed with 2% by weight of triphenyl bismuthine and the mixture heated in a tin cup for 5 hours at 100° C. The resulting polymer had a Barcol hardness of 25 and a light yellow color.

Similar results are obtained by replacing the hexahydrophthalic anhydride in the above process with equivalent amounts of each of the following: chloromaleic anhydride, phthalic anhydride and pyromellitic anhydride.

I claim as my invention:

1. A process for producing a resinified product which comprises mixing and reacting a polyepoxide having a

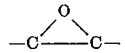

equivalency greater than 1.1 with a polycarboxylic acid anhydride and an activator for the anhydride comprising a member of the group consisting of hydrocarbyl-substituted phosphines, hydrocarbyl-substituted arsines, hydrocarbyl-substituted stibines and hydrocarbyl-substituted bismuthines.

2. A process for producing a resinified product which comprises mixing and reacting a polyepoxide having a 1,2-epoxy equivalency of at least 1.1 with at least .8 equivalent of a polycarboxylic acid anhydride and from 0.1% to 10% by weight of the resin of an activator for the anhydride comprising a member of the group consisting of hydrocarbyl-substituted phosphines, hydrocarbyl-substituted arsines, hydrocarbyl-substituted stibines and hydrocarbyl-substituted bismuthines.

3. A process as in claim 2 wherein the polyepoxide is a glycidyl polyether of a polyhydric phenol having a 1,2-epoxy equivalency between 1.1 and 2.0 and a molecular weight between 200 and 900.

4. A process as in claim 2 wherein the polyepoxide is a glycidyl polyether of a polyhydric alcohol having a 1,2-epoxy equivalency between 1.1 and 3 and a molecular weight between 170 and 800.

5. A process as in claim 2 wherein the anhydride is an aromatic hydrocarbon polycarboxylic anhydride.

6. A process as in claim 2 wherein the anhydride is a cycloaliphatic hydrocarbon dicarboxylic acid anhydride.

7. A process as in claim 2 wherein the activator is a trihydrocarbyl phosphine.

8. A process as in claim 2 wherein the activator is a trihydrocarbyl arsine.

9. A process as in claim 2 wherein the activator is a trihydrocarbyl stibine.

10. A process as in claim 2 wherein the activator is a trihydrocarbyl bismuthine.

11. A process as in claim 2 wherein the activator is tri(2-ethylhexyl) phosphine.

12. A process as in claim 2 wherein the activator is triphenyl phosphine.

13. A process as in claim 2 wherein the activator is triphenyl arsine.

14. A process as in claim 2 wherein the activator is triphenyl bismuthine.

15. A process as in claim 2 wherein the polyepoxide is a polymer of an alkenyl glycidyl ether obtained by polymerizing the compound through the alkenyl group.

16. A process as in claim 2 wherein the anhydride is chlorendic anhydride.

17. A process as in claim 2 wherein the anhydride is hexahydrophthalic anhydride.

18. A process as in claim 2 wherein the anhydride is phthalic anhydride.

19. A process as in claim 2 wherein the anhydride is chloromaleic anhydride.

References Cited in the file of this patent

UNITED STATES PATENTS 2,324,483  Castan _____ July 20, 1943